Patented Nov. 6, 1945

2,388,526

UNITED STATES PATENT OFFICE 2,388,526

METHOD OF PREPARING A COATING COMPOSITION

William L. Craig, Westport, Conn., assignor to R. T. Vanderbilt Company, Inc., New York, N. Y., a corporation of New York No Drawing. Application December 11, 1941, Serial No. 422,522

3 Claims. (Cl. 106—214)

This invention relates to a method of preparing a coating composition adapted for the coating of fibrous sheet materials such as paper.

The usual type of coating composition used for the coating of fibrous sheet material such as paper consists essentially of a mineral or pigment such as clay, titanium dioxide, calcium carbonate, barium sulfate, calcium sulfate, etc., plus a prepared adhesive such as casein or starch. The finished composition may also contain such materials as defoaming agents, leveling agents, etc., and, if it is to be used to impart color to the fibrous sheet material, may also include dyes or color pigments.

In the usual preparation of such compositions it has been the practice to disperse the mineral or pigment in water by mechanical agitation and then mix the resulting composition with an adhesive which is prepared separately. Thus if casein is used as the adhesive, it is first mixed with water and then an alkaline material such as soda ash, borax, trisodium phosphate, caustic soda or ammonia, and the resulting composition is then heated to dissolve the casein.

If a treated starch such as chlorinated gum is to be used as the adhesive, the starch is dispersed in water and heated to put the starch into colloidal solution. An untreated starch such as raw corn starch, tapioca starch or potato starch may be prepared by admixing the starch with water and then heating the mixture in the presence of an amylolytic enzyme to convert the starch into a mixture of the desired viscosity.

In the usual preparation of coating compositions, the aqueous mineral or pigment suspensions are mixed with adhesive compositions of the type indicated above.

In accordance with the process of this invention, a coating composition is prepared by forming an aqueous suspension of a mineral or pigment, incorporating a raw starch in the suspension and then subjecting the resulting composition to the action of an amylolytic enzyme. The new compositions produced by this procedure in which the conversion of the starch is carried out in the presence of the mineral or pigment appear to have a film of colloidal starch around the mineral or pigment particles. The new compositions have important advantages and result in the production of coated fibrous sheet materials having improved gloss and smoother surface characteristics as well as improved adherence of the coating to the sheet to which it is applied.

The enzyme used in effecting the conversion of the starch is advantageously a liquefying enzyme as distinguished from a saccharifying enzyme, particularly a liquefying enzyme produced by bacterial fermentation, having a high alpha amylase content and substantially free from beta amylase, insensitive to temperatures up to about 180° F. and active in alkaline media. The enzyme should have a liquefon (Analytical Edition, Journal of Industrial and Engineering Chemistry, volume 7, pages 143-6, May 15, 1935) content of about 500–1200 per gram.

In preparing the new coating compositions in accordance with my invention, the desired proportions of mineral or pigment and starch are thoroughly mixed together in water and the pH of the mixture is adjusted to approximately neutral, advantageously within a pH range of from about 6.5 to 7.5, by the addition of a small amount of either an alkaline material, such as borax, or an acid material such as alum. A suitable amount of a liquefying enzyme is then added and the mixture is heated until the enzyme converts the starch and reduces the viscosity of the mixture to a point where it is suitable for application to paper or other fibrous sheet materials by the usual coating methods.

The invention will be further illustrated by reference to the following examples, but the invention is not limited thereto.

*Example 1*

A coating composition is prepared from the following materials in the proportions indicated.

|  | Parts |
|---|---|
| Coating clay | 100 |
| Pearl corn starch (raw or untreated) | 25 |
| Liquefying enzyme | 0.5 |
| Water | 204 |
| Tetra-sodium-pyrophosphate | 0.1 |

The tetra-sodium-pyrophosphate, which is used as an agent for dispersing the clay, was dissolved in the water. The dry clay was then added to the water and dispersed by mechanical agitation. The dry starch and the enzyme were then added and dispersed. The pH of the mixture was adjusted to about 7.0 by the addition of about 0.25 part of borax. The mixture was heated in a steam jacketed kettle to about 170° F. and held there for about 15 minutes; the temperature was then raised to 200° F. and held there for about 10 minutes; the mixture was then cooled to room temperature. The coating composition prepared in this manner is adapted for application to paper by brush coating. It had the following viscosity as determined on a modified Stormer viscosimeter. Figures for distilled water and 95% glycerine solutions are given to serve as a basis of comparison.

|  | ° F. | Grams | CPS (centipoises) |
|---|---|---|---|
| Distilled water | 80 | 20 | 1.0 |
| Glycerine 95% soln | 80 | 165 | 8.25 |
| Above product | 80 | 42 | 2.01 |

*Example 2*

A coating composition is prepared from the following materials in the proportions indicated.

|  | Parts |
|---|---|
| Coating clay | 50 |
| Titanium dioxide | 50 |
| Pearl corn starch | 15 |
| Liquefying enzyme | 0.15 |
| Water | 204 |
| Tetra-sodium-pyrophosphate | 0.05 |

The tetra-sodium-pyrophospate was dissolved in the water and thereafter the clay and then the titanium dioxide were dispersed in the water. The starch and enzyme were then added and thoroughly dispersed and the pH of the mixture was adjusted to about 7 by the addition of borax. Thereafter the mixture was heated with live steam until the starch gelatinized at a temperature of about 160° F. The mixture was maintained at this temperature for about 5 minutes and the temperature was then raised to about 170° F. and maintained at this point for about 15 minutes. Thereafter the temperature was increased to 200° F. and after maintaining the mixture for about 10 minutes at this temperature it was cooled to room temperature. The viscosity of the resulting composition was such that it was particularly adapted to the coating of paper by "machine coating." The composition had the following viscosity as determined on a modified Stormer viscosimeter.

|  | ° F. | Grams | CPS (centipoises) |
|---|---|---|---|
| Above product | 80 | 325 | 16.25 |

Comparable viscosities for distilled water and 95% glycerine solutions are given in Example 1.

Instead of corn starch other starches such as for example tapioca or potato starch may be used in preparing the new compositions. Similarly the minerals or pigments with which the starch is admixed prior to its conversion may include the usual types of minerals or pigments employed in the coating of paper or other fibrous sheet materials.

Paper which has been coated with compositions prepared in accordance with this process has important advantages over the paper treated with the usual type of coating composition. The new coating compositions have superior binding strength, that is, adherence to the paper, and produce a higher finish or gloss and a smoother surface on the paper. Coated paper having improved opacity may also be produced with the new compositions.

I claim:

1. The method of preparing coating compositions which comprises forming an aqueous suspension of a material from the group consisting of minerals and pigments, incorporating a raw starch therein and subjecting the resulting mixture to the action of an amylolytic enzyme.

2. The method of preparing coating compositions which comprises forming an aqueous suspension of a material from the group consisting of minerals and pigments, incorporating a raw starch therein and subjecting the resulting mixture to the action of a liquefying enzyme.

3. The method of preparing coating compositions which comprises forming an aqueous suspension of a material from the group consisting of minerals and pigments, incorporating a raw starch and a liquefying enzyme therein, adjusting the pH of the mixture to between about 6.5 to 7.5 and then heating the resulting composition to liquefy the starch.

WILLIAM L. CRAIG.